Nov. 14, 1944.   R. D. ACTON   2,362,521
HYDRAULIC BRAKING SYSTEM FOR TRACTORS
Filed Feb. 12, 1942   4 Sheets-Sheet 1

Inventor
Russel D. Acton
By Paul O. Rippel
Atty.

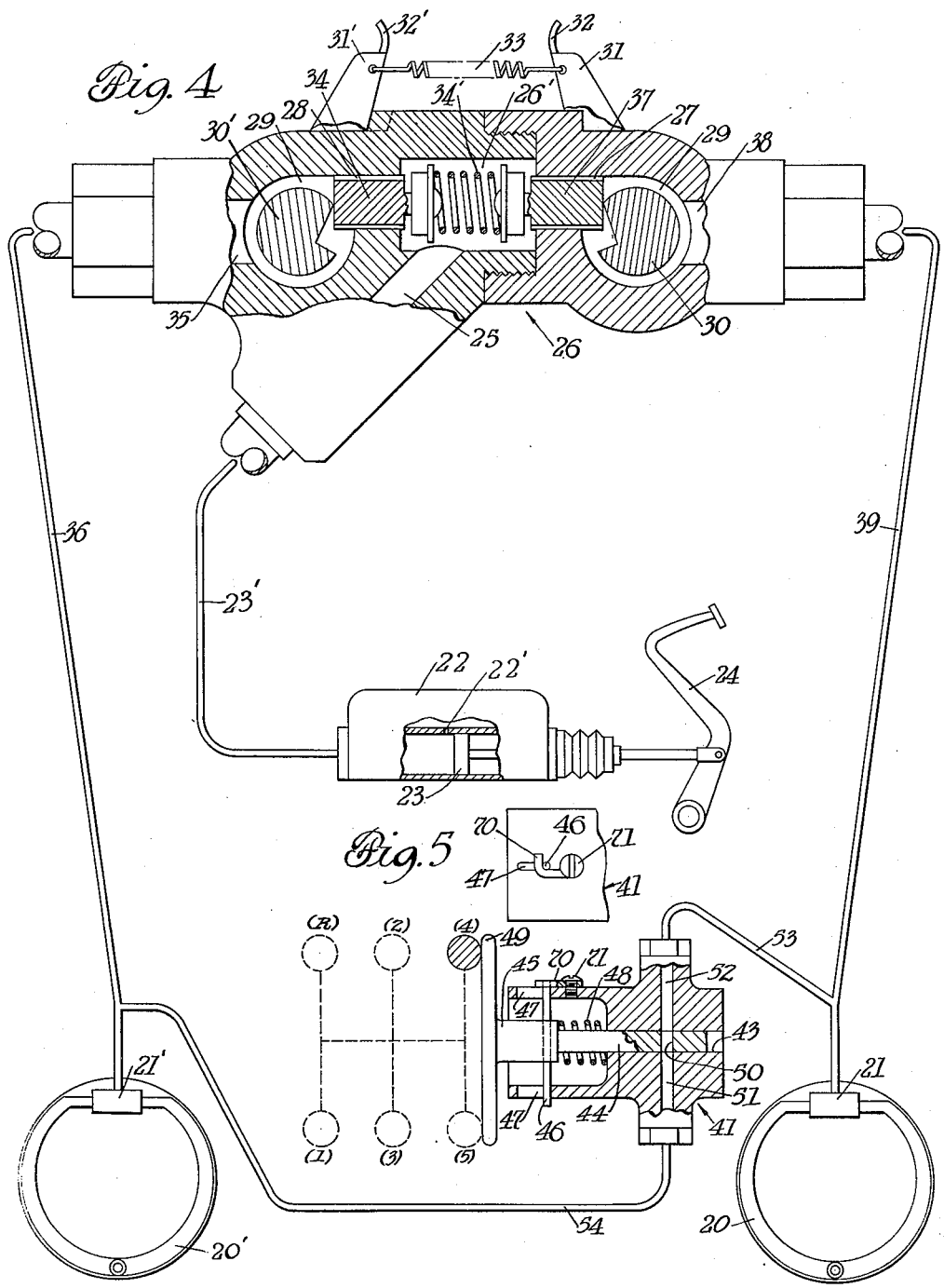

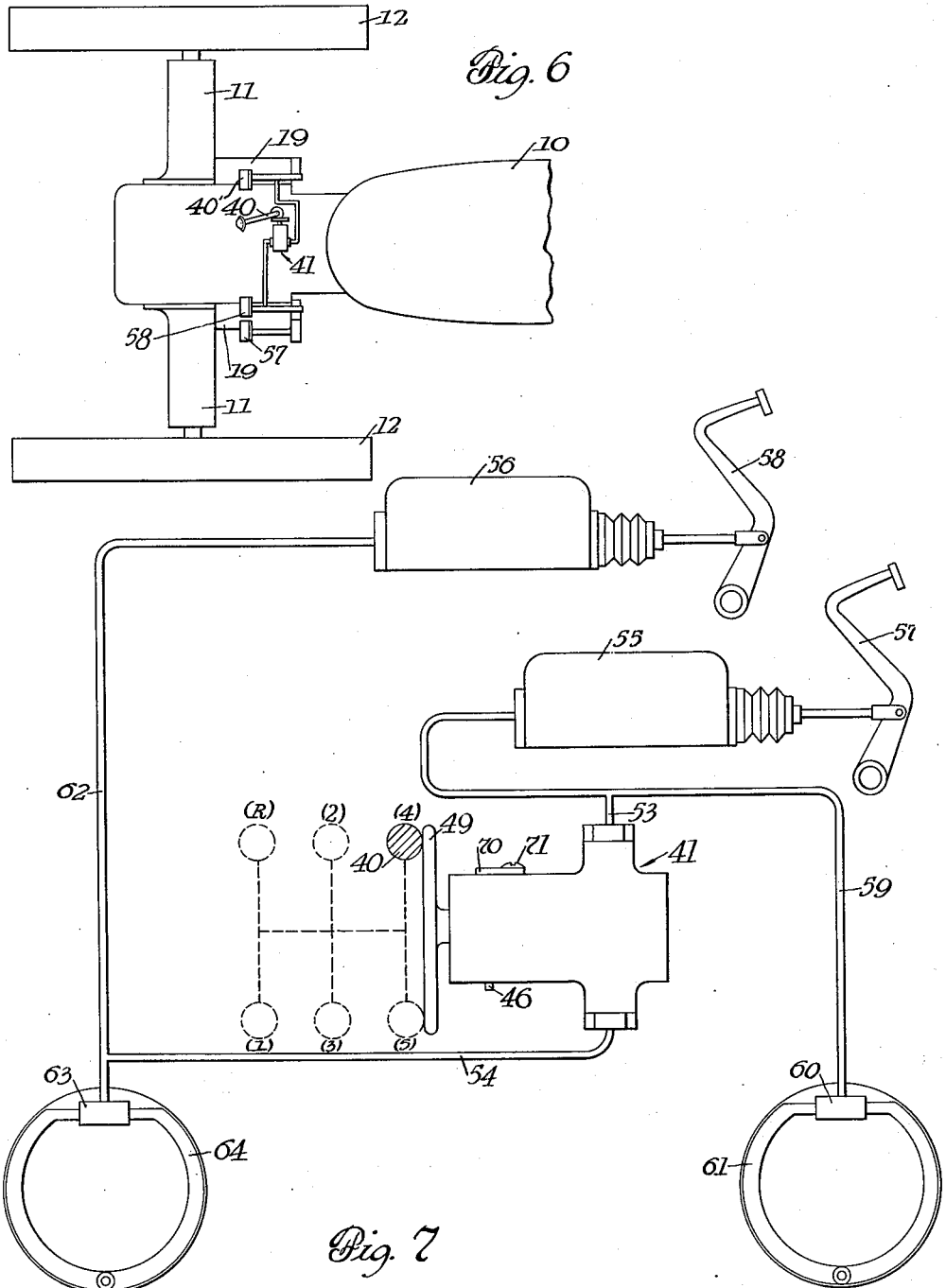

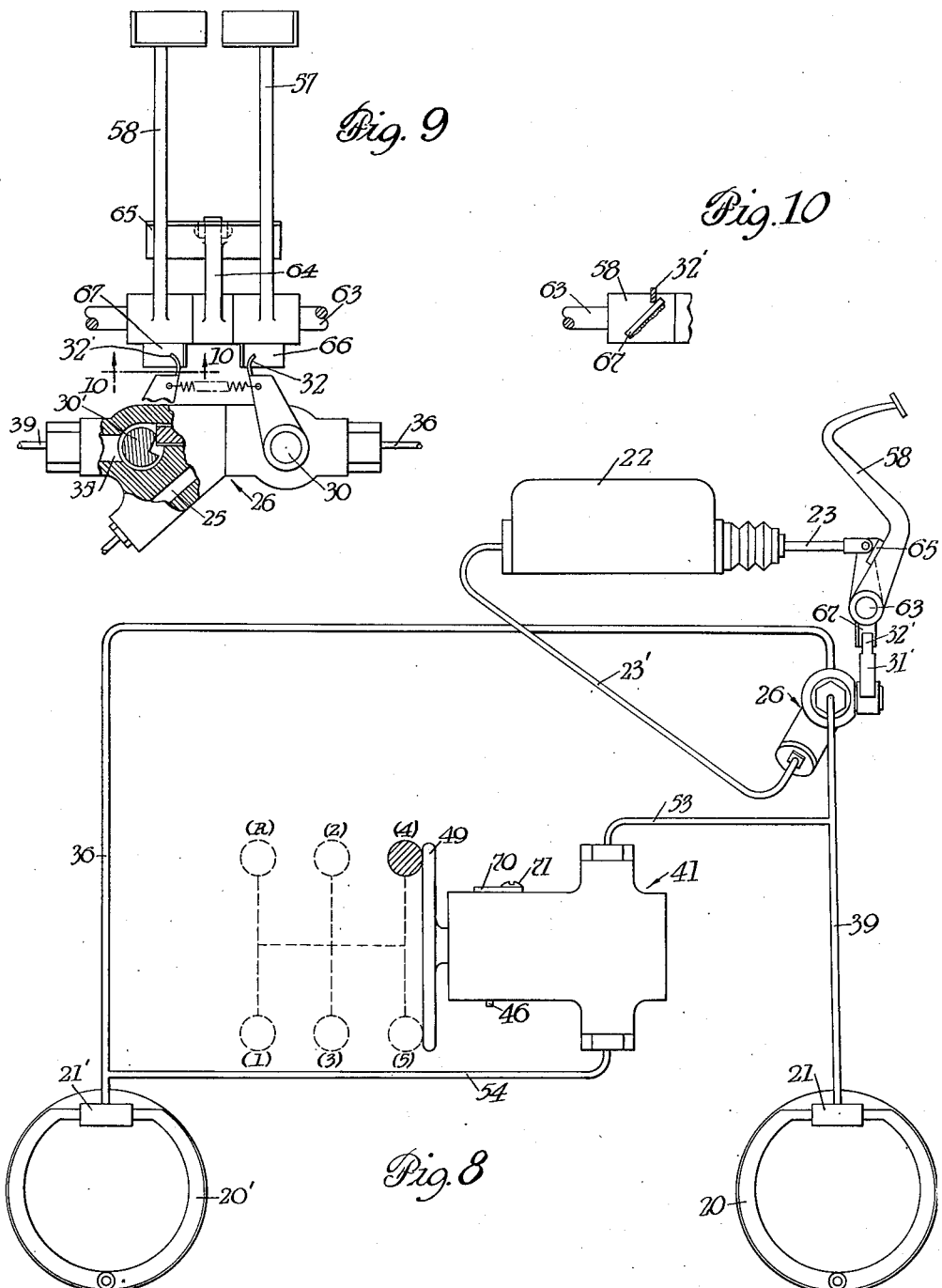

Patented Nov. 14, 1944

2,362,521

UNITED STATES PATENT OFFICE 2,362,521

HYDRAULIC BRAKING SYSTEM FOR TRACTORS

Russel D. Acton, Chicago, Ill., assignor to International Harvester Company, a corporation of New Jersey Application February 12, 1942, Serial No. 430,659

18 Claims. (Cl. 180—18)

This invention relates to braking systems for vehicles and, more particularly, to a short-turn braking system controllable by steering of the vehicle. The principle object of this invention is to provide a braking system for a vehicle which is controlled by the steering mechanism so that the brakes may be employed to assist in short-turn steering during low-gear speeds of the tractor and in which the short-turn control means is rendered inoperative when the tractor is operated at high speed.

Another and more specific object is to provide a by-pass conduit, or short-circuiting conduit, between the pressure supply lines to independently operate brakes whereby the gear shift mechanism may be utilized to render said by-pass conduit selectively operative or inoperative depending upon the gear ratio which is selected.

These objects and others, which will be apparent from the detailed description to follow, are accomplished by a construction as shown in the drawings, in which:

Figure 4 is a diagrammatic view showing the steering control valve device in section and the by-pass control valve structure in section with the brakes and the brake-actuating structure shown diagrammatically in relation to the valve structure;

Figure 5 is an elevation of the manual latch carried by the valve device of Figure 4;

Figure 6 is a plan view of the rear portion of a tractor illustrating a modified form of the invention in which independent foot brakes are utilized for the rear wheel brakes;

Figure 7 is a diagrammatic view showing the entire system of the modification shown in Figure 4 illustrating the independent brake-operating means, the independent brakes, and the by-pass valve structure.

Figure 8 is a diagrammatic view of a modification of the braking system shown in Figure 7;

Figure 9 is an enlarged view of the brake pedals and the valve structure operated thereby of Figure 8; and Figure 10 is a detail of the valve operating cam portion of one of the brake pedals.

Figure 1:
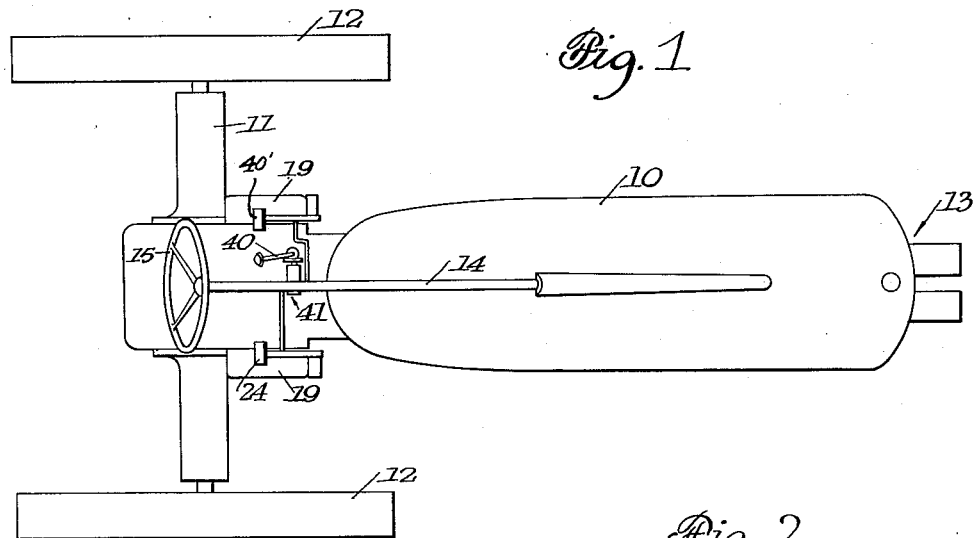
Figure 1 is a plan view of an agricultural tractor for which the invention is particularly adapted.

Figure 1 illustrates a conventional agricultural tractor of the tricycle type having a comparatively narrow longitudinal body 10, an extended rear axle structure 11 on which traction wheels 12 are mounted, and a steerable front truck 13. A steering column 14 having a steering wheel 15 at the rear end is adapted to operate, in a conventional manner, a vertical post 16 which carries the front truck 13. This construction is well known in the art and has been illustrated only diagrammatically. The post 16, as indicated by the arrows at the lower end, is rotated angularly only the distance required to angle the front truck 13 the desired amount to make a turn. The post 16 carries, rigidly secured thereto, a sleeve 17 on which two cams 18 are located.

Figure 2:
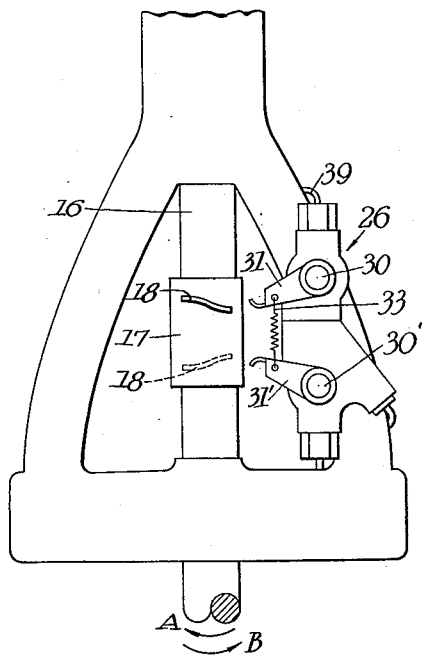
Figure 2 is an enlarged front elevation of the steering bolster of the tractor shown in Figure 1, particularly showing the valve device for controlling the application of the independent rear wheel brakes.

The tractor as shown in Figure 1 is provided with housings 19 which enclose brakes for the wheels at the respective sides of the tractor. This is a conventional tractor design and has been illustrated only diagrammatically. As shown in Figure 4, brake shoes 20 at the right side of the tractor and brake shoes 20' at the left side of the tractor are diagrammatically illustrated as being operated, respectively, by hydraulic brake operating cylinders 21 and 21'. In the same figure, a master cylinder 22 is illustrated having a piston assembly 23 adapted to be operated by a foot pedal 24. Said foot pedal is also shown in Figure 1. Fluid delivered under pressure from the master cylinder 22 is delivered through a conduit 23' to a conduit 25 formed in a valve structure casing 26. Said casing and the conduit valve structure are substantially the same as that disclosed and claimed in the Milster Patent 2,254,902. The conduit or passage 25 communicates with a chamber 26' within the casing which connects by alined passages 27 and 28 with chambers 29. Said chambers contain stub shafts 30 and 30' which project through the casing, being secured to arms 31 and 31', as shown in Figure 2. Said arms are provided with out-turned extensions 32 and 32' adapted to be engaged by the cams 18. A spring 33 holds the arms together in the position shown in Figure 2. When the steering column is turned in the direction of the arrow B to make a left turn, as indicated in Figure 2, the upper cam 18 engages the out-turned end 32 of the upper arm 31, thereby operating the corresponding stub shaft 30 to release pressure on a valve 37 slidably mounted in the passage 27. This release of pressure on said valve allows a compression spring 34' to move the valve into seated position, thereby closing communication between the central chamber 26' and the chamber 29. When said valve is closed the supply of fluid under pressure through an outlet conduit 38 connecting with the chamber 29 is cut off and there is no fluid flow through a conduit 39 connecting the conduit 38 and the operating cylinder 21 and no application of the brake 20 at the right side of the tractor.

When the steering post 16 is turned to make a right turn in the direction of the arrow A, the lower cam 18 engages the out-turned arm 32' on the lower lever arm 31', thereby releasing through the shaft 30' a valve 34 slidably mounted in the passage 28, allowing said valve to seat and close said passage. It will be understood that the valves 34 and 37 are mounted in clearance relation with respect to the passages 28 and 27 to provide for fluid flow therethrough when the valves are off their seats. When the valve 34 is seated, fluid pressure is not transmitted from the chamber 29 through a conduit 35 in the casing and a conduit 36 leading to the operating cylinder 21' of the brake at the left side of the tractor. When the valves are both open, as shown in Figure 4, which is at all positions of the steering post before a sufficient angle has been reached in either direction to close the valves 34 and 37, fluid is supplied at equal pressure to both of the brake-operating cylinders 21 and 21'.

In so far as the structure is described up to this point, it is substantially the same as that described and claimed in the above identified Milster patent. In the operation of a tractor at high speeds, it is very undesirable to have a braking system by which braking pressure may be applied at one side, or to one wheel, only of the tractor. Applicant has therefore provided a by-pass or short-circuiting device which is operated by the gear-selecting means to provide communication between the respective conduits to the brake-actuating cylinders at gear ratios where it is not desired to provide short-turn braking.

As shown in Figure 1, a gear shift lever 40 is located in its usual position and is adapted to be shifted upon actuation of the conventional clutch pedal 40' into various ranges for selecting the different gear ratios provided in the transmission of the tractor. As shown in Figure 4, the dotted lines indicate six positions for said gear shift lever. When the lever is shifted entirely to the left, the reverse gear is selected by moving the lever forwardly and the lowest gear, designated by the numeral 1, is selected by moving the lever to the rear. When the gear shift lever is moved forwardly from an intermediate position to the right of this extreme left position, the second higher gear is selected, designated by the numeral 2. When said lever is moved to the rear of this position, the third highest gear is selected as designated by the numeral 3. When the gear shift lever is moved to the extreme right and shifted forwardly, the fourth speed is selected, as designated by the numeral 4. In the conventional farm tractor, this is the highest gear ordinarily used for field work and may also be used for hauling on the highways. This speed is usually somewhere about five miles per hour. In modern tractors utilizing rubber tires, a fifth speed is provided which has a much higher gear ratio, giving speeds up to 15 and 20 miles. In the diagram, this speed is selected by moving the gear shift lever to the rear from its extreme right position.

Figure 3:
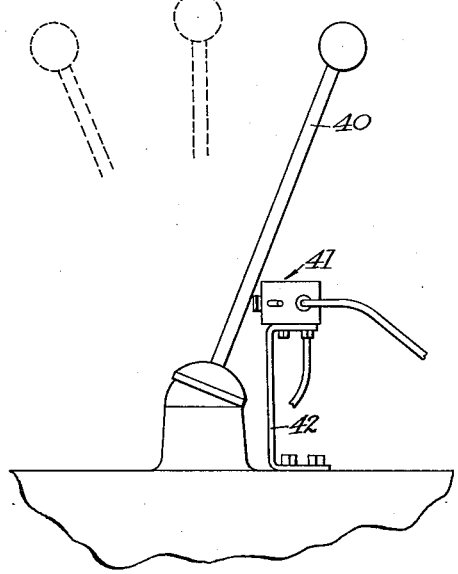
Figure 3 is an enlarged elevation showing the relation of the gear shift lever with respect to the by-pass controlling valve structure.

As shown in Figures 1, 3, and 4, a valve structure having a casing 41 is mounted on a bracket 42 alongside the gear shift lever. As shown in the section of Figure 4, said casing is provided with a bore 43 in which a slidable plunger 44 is mounted for reciprocation. An actuating member 45 is secured to one end of the plunger 44 by a pin 46 which extends through slots 47 at one end of the casing to hold the plunger against angular movement in the bore 43. A spring 48 is mounted in a chamber at the actuating member end of the casing abutting the casing and the end of the actuating member 45 to urge the plunger in a direction to the left, referring to Figure 4. The actuating member 45 is provided with a head portion 49 which is extended fore and aft so that it may be engaged by the gear shift lever 40 when said lever is shifted to its extreme position to the right, and will remain engaged by the said lever during selection of either the fourth or fifth gear speed ratios. The plunger 43 is provided with a right-angled bore 50 which, when the plunger is pushed inwardly during selection of the fourth or fifth speed gears, is in axial alinement with bores 51 and 52 provided in the casing 41. Said bores form conduits which are connected by suitable fittings with fluid-pressure conduits 53 and 54, said conduits connecting respectively to the conduits 39 and 36, previously described. It will be understood from the above description that when the gear shift lever is in a position to select the fourth speed, as indicated, or to select the fifth speed, an open communication will be formed between the conduits 36 and 39 by means of the conduits 53 and 54. The action of the valve structure as actuated by the cams 18 on the steering post will be ineffective to obtain individual short-turn braking as pressure applied through either of the conduits 36 or 39 is applied to both of the actuating cylinders 21. However, when the gear shift lever is shifted into any of the other positions—that is, reverse and first, second, or third speed gears—the plunger 50 is moved axially by the spring 48 to close communication between the conduits 53 and 54. By this construction the advantages of the structure shown in the Milster patent have been obtained with the safeguard that at higher speeds of the tractor, where short-turn braking is dangerous, the brakes are equally applied at all times by automatic means independent of the operator of the tractor.

The modification shown in Figures 6 and 7 utilizes independent actuating means for each of the rear wheel brakes including separate actuating cylinders 55 and 56, which are operated by independent foot pedals 57 and 58. The master cylinder 55 is connected by a conduit 59 with an actuating cylinder 60 for a brake 61 at the right side of the tractor. The master cylinder 56 is connected by a conduit 62 with an actuating cylinder 63 for a brake 64 at the left side of the tractor. In the use of a tractor of this type, the operator, for short-turn braking, selects the right- or left-hand brake, depending on the direction the tractor is to be turned.

When a brake system of this type is used for higher speeds, such as road hauling, the pedals in prior art structures have sometimes been locked together or they are so located that the operator may step on both pedals at the same time. This method of actuation is not satisfactory as unequal wear of the brakes requires different amounts of pedal depression with the result that the brakes cannot be evenly applied by either locking the pedals together or by attempting to operate both pedals at the same time. To overcome this difficulty, the by-pass structure illustrated in detail in connection with the form of the invention shown in Figures 1 to 4, inclusive, has been incorporated into the system shown in Figure 7. The valve structure and all its parts are the same as in Figure 4 and bear the same reference characters. The conduit 53 is connected into the conduit 59 to the brake at the right side of the tractor, and the conduit 54 is connected into the conduit 62 at the left side of the tractor. It will be understood from the explanation of the operation of the structure shown in Figure 4, that whenever the fourth or fifth gear ratios are selected by the gear shift lever 40, as diagrammatically illustrated in Figure 7, the valve-actuating member 45 is depressed, thereby providing fluid communication between conduits 53 and 54. During this position of the valve shift lever and of the plunger actuated thereby, pressure is equalized between the two brakes. It is then immaterial whether the operator depresses one brake or the other, or whether both are depressed, either by locking them together or by engaging both pedals. In any one of these instances, pressure is applied equally to both brakes with equal braking. This avoids the danger which is inherent in utilizing individual brakes at each side of the tractor during high-speed operation.

Another modification is shown in Figures 8 to 10, inclusive. This form is similar to the form shown in Figure 7, except that only one power-applying cylinder is used. All of the corresponding parts in this structure bear the same numerals as in Figures 1 to 4, inclusive, and Figure 7. Brake pedals 57 and 58 are pivotally mounted on a supporting shaft 63. Between said pedals a member 64 is also pivotally mounted on said shaft. Said member has an upwardly projecting arm to which a transverse element 65 is secured. Said element, as shown in both Figures 8 and 9, extends transversely across the brake pedals 57 and 58 forwardly thereof. The extending piston rod of the piston assembly 23 is pivotally connected to the upstanding arm of the member 64. By means of this construction, the depression of either the right-hand pedal 57 or the left-hand pedal 58 engages the element 65 and exerts pressure on the piston assembly 23 thereof, delivering fluid under pressure through the conduit 23' to the passage 25 in the valve structure casing 26. Said structure is exactly the same as described in connection with the form of the device shown in Figures 1 to 4, inclusive, and the corresponding parts bear the same reference numerals. In this structure, the upstanding arms 32 and 32' are positioned to be engaged by cam elements 66 and 67 provided respectively on the brake pedals 57 and 58. Figure 10 shows a plan view of one of these elements illustrating the cam faces. The cam face of one of the elements engages the lever 32' to oscillate it about its axis.

As an explanation of the operation of this form of the device, when the right-hand pedal 57 is depressed during a turn to the right, the first portion of the movement of the pedal closes the valve at the right-hand side of the valve casing, as illustrated in Figure 9, thereby cutting off the flow of fluid to the conduit 36. As illustrated diagrammatically in Figure 8, the conduit 36 leads to the brake at the left-hand side of the tractor. As the pedal 57 is moved a greater degree, the piston assembly 23 passes the reloading orifice 22' in the master cylinder 22 and, as shown in Figure 4, applies pressure through the conduit 23' and through the conduit 39 to the brake at the right-hand side of the tractor.

When the left-hand pedal 58 is operated, the valve at the left-hand side of the valve structure casing 26, as shown in Figure 9, is cut off during the first portion of the travel of the brake, cutting off the supply of fluid through the conduit 39 leading to the brake at the right-hand side of the tractor. As the pedal is further engaged, the piston in the master cylinder is operated thereby supplying fluid under pressure through the conduit 23' to the valve casing 26 and therefrom through the conduit 36 to the brake at the left-hand side of the tractor. It is evident from the above description that the operator may, by means of such a structure, selectively apply the brake at either side of the tractor by means of separate brake pedals and with the use of only a single fluid-pressure supply means in the form of a master cylinder.

If it is desired to manually operate the valve 44 controlling communication between the brakes, a manual latch 70 hinged on a screw 71 threaded into the casing 41, as shown in Figures 4, 5, 7, and 8, may be provided. Said latch is positioned and shaped to engage one of the protruding ends of the pin 46 to hold the valve plunger 44 in open position when independent wheel brakes are not desired. Said latch, although shown in plunger-locking position, is normally dropped out of engagement with the pin 46.

It is to be understood that only certain preferred embodiments of applicant's improved braking system have been illustrated and described. The actuation of the short circuiting, or by-pass, device has been illustrated by an actuating member engageable by movement of the gear shift lever. In order to eliminate the exposure of conduits which are apt to be damaged, this structure can be built into the tractor structure so as not to be in an exposed position. It is to be understood also that all such modifications, as well as modifications in the means for actuating the valve selector mechanism by steering of a tractor wheel, which may be covered by the attached claims are included as a part of applicant's invention.

What is claimed is:

1. In a braking system for tractors having a pair of traction wheels and, in combination therewith, speed-varying means and an independent brake for each of said traction wheels, means for independently operating each of said brakes, and means operable by said speed-varying means at a certain predetermined speed for connecting said brake-operating means together whereby the brakes are operated in unison upon operation of either of said independent operating means when the tractor is operated at said speed.

2. A braking system for tractors having a pair of traction wheels and, in combination therewith, speed-varying means, an independent brake for each of said wheels, separate brake-operating means for independently operating each of said brakes, and means operable by said speed-varying means at a certain predetermined speed for interconnecting said brake-operating means whereby the brakes are operated in unison upon operation of either of said independent operating means when the tractor is operated at said speed.

3. In a braking system for tractors having a pair of traction wheels and, in combination therewith, speed-varying means, an independent brake for each of said traction wheels, hydraulic actuating means for each of said brakes, brake-operating means for delivering fluid under pressure to said actuating means for independently operating each of the brakes, and means operable by said speed-varying means at a predetermined speed for connecting said brake-operating means together whereby they are operated in unison upon operation of either of said independent operating means with fluid under equal pressure being supplied to each actuating means while the tractor is operated at said speed.

4. In a braking system for tractors having a pair of traction wheels, a change speed transmission, and a gear shift lever and, in combination therewith, an independent brake for each of said wheels, hydraulic actuating means for each of said brakes, pedal-operated means for supplying fluid under pressure to said actuating means including independent conduits, conduit means providing a communication between said conduits, and valve means selectively operable in response to positioning of the gear shift lever when certain speeds are selected to provide for either the blocking of the conduit means or for the flow of the actuating fluid through said conduit means.

5. In a braking system for tractors having a pair of traction wheels, a change speed transmission, and a gear shift lever and, in combination therewith, an independent brake for each of said wheels, hydraulic actuating means for each of said brakes, independent pedal-operated means for supplying fluid under pressure to each of said actuating means including independent conduits, conduit means providing a communication between said conduits, and valve means selectively operable in response to positioning of the gear shift lever when certain speeds are selected to provide for either the blocking of the conduit means or for the flow of the actuating fluid through said conduit means.

6. In a braking system for tractors having a pair of traction wheels, a change speed transmission having at least one gear ratio for operating the tractor at a low speed and another gear ratio for operating the tractor at a much higher speed, and a gear shift lever for selecting said gear ratios and, in combination therewith, an independent brake for each of said wheels, hydraulic actuating means for each of said brakes, pedal-operated means for supplying fluid under pressure to said actuating means including independent conduits, conduit means providing a communication between said conduits, and valve means selectively operable in response to positioning of the gear shift lever to block said conduit means when the gear ratio for the lower speed is selected and to open said conduit means to provide for the flow of the actuating fluid through said conduit means when the higher gear ratio is selected, whereby equal fluid pressure is applied to each actuating means in said latter gear ratio.

7. In a braking system for tractors having a pair of rear traction wheels, a front wheel, steering means for said wheel, gear ratio selecting means, an individual brake for each traction wheel, brake-applying means, means operative upon steering of the front wheel to render effective only the brake at the side of the tractor in which direction the turn is being made and, in combination therewith, means engageable by the gear-selecting mechanism to connect the brakes together regardless of the position of the steerable wheel when the gear ratio selecting means is in position to select gear ratios which give the tractor sufficient speed to make braking by steering undesirable for simultaneous operation.

8. In a braking system for tractors having a pair of rear traction wheels, a steerable front wheel and means for selecting different gear ratios and, in combination therewith, an individual hydraulically actuated brake for each traction wheel, a single braking pedal and a single hydraulic master cylinder operated thereby, a valve device operated by steering of the front wheel, an independent fluid conduit connecting said device with each of the brakes, a fluid conduit connecting the master cylinder with said device, said valve device being operative upon steering of the front wheel to render effective the brake at the side of the tractor in which direction the turn is being made and to render the other brake ineffective, a by-pass fluid conduit connected between the conduits to the brakes, a valve device interposed in said conduit, and actuating means for said device engageable by the gear-selecting means to open said conduit for flow therethrough whereby fluid pressure is applied to both brakes regardless of the position of the steerable wheel when the gear-selecting means is in positions to select a certain predetermined gear ratio.

9. In a braking system for tractors having a pair of rear traction wheels, a wheeled front support, means for steering said support and means for selecting different gear ratios and, in combination therewith, an individual hydraulically actuated brake for each traction wheel, a single braking pedal and a single hydraulic master cylinder operated thereby, a valve device operated by the steering means, an independent fluid conduit connecting said device with each of the brakes, a fluid conduit connecting the master cylinder with said device, said valve device being operable by the steering means to render effective the brake at the side of the tractor in which direction a turn is being made and to render the other brake ineffective, a fluid by-pass conduit interconnecting the conduits to the brakes, a valve device interposed in said by-pass conduit, and actuating means for said second device engageable by the gear ratio selecting means to open said by-pass conduit for flow therethrough whereby fluid at the same pressure is applied to both brakes at any position of the steering means when the gear-selecting means is in positions to select a certain predetermined gear ratio.

10. In a braking system for tractors having a pair of rear traction wheels, a transmission having several gear ratios for operating the tractor at low speeds and at least one gear ratio for operating at a much higher speed, a front wheel, steering means for said wheel and gear-selecting means comprising, in combination therewith, an individual brake for each traction wheel, brake-applying means, a valve device operated by steering of the front wheel, an independent fluid conduit connecting said device with each of the brakes, fluid conduit means connecting the brake-applying means with said device, said valve device being operative upon actuating of said steering means to render effective only the brake at the side of the tractor in which direction the turn is being made, a by-pass fluid conduit interconnecting the conduits to the brakes, a valve device interposed in said by-pass conduit and actuatable by positioning of the gear-selecting mechanism to open said by-pass conduit for flow whereby fluid pressure is supplied to both brakes regardless of the position of the steerable wheel when the gear shift lever is in position to select the higher speed which gives the tractor sufficient speed to make braking by steering dangerous.

11. In a braking system for tractors having a pair of traction wheels, gear ratio selecting means comprising, in combination therewith, an individual brake for each traction wheel, a corresponding brake-applying means for each of said individual brakes, a valve device operated by either or both of said brake-applying means, an independent fluid conduit connecting said device with each of the brakes, a hydraulic master cylinder operable by either or both of said brake-applying means, fluid conduit means connecting said cylinder with said valve device, said device being operative by the corresponding brake applying means to supply fluid to either of said brake conduits, a fluid by-pass conduit interconnecting the conduits to the brakes, a valve device interposed in said by-pass conduit and including means actuated by positioning of the gear ratio selecting means to open said by-pass conduit for flow whereby fluid pressure is supplied to both brakes upon operation of either of said brake applying means.

12. In a braking system for tractors having a pair of traction wheels and a speed-varying means and, in combination therewith, an independent brake for each of said wheels, hydraulic actuating means for each of said brakes, pedal-operated means for supplying actuating fluid under pressure to said actuating means including independent conduits, means including an interconnecting conduit providing a free communication between said conduits for the flow of the actuating fluid when certain predetermined speeds are selected by the speed-varying means, and means for blocking said interconnecting conduit when certain other predetermined speeds are selected by the speed varying means.

13. In a braking system for tractors having a pair of traction wheels and a speed-varying means and, in combination therewith, an independent brake for each of said wheels, hydraulic actuating means for each of said brakes, a single pedal-operated means for supplying actuating fluid under pressure, means for delivering fluid so supplied to either of said actuating means including independent conduits, means including an interconnecting conduit providing a free communication between said conduits for the flow of the actuating fluid when certain predetermined speeds are selected by the speed-varying means, and means for blocking said interconnecting conduit when certain other predetermined speeds are selected by the speed varying means.

14. In a vehicle provided with a steering mechanism, with an operator-operated member forming part of a means for controlling the moving of the vehicle in a normal manner and two driving members associated therewith, a braking system for the driving members, means operable when the steering mechanism is controlled to turn the vehicle in one direction for so controlling the braking system that when it is operated only one brake of said driving members will be applied and when controlled to turn the vehicle in the other direction for so controlling the braking system that when it is operated the other brake only of said driving members will be applied, and means operable when the operator-operated member is in a predetermined condition assumed during the controlling of the moving of the vehicle for preventing the steering mechanism from controlling the braking system.

15. In a vehicle provided with a steering mechanism, with a change speed gearing and two driving members associated therewith, a braking system for the driving members, means operable when the steering mechanism is controlled to turn the vehicle in one direction for so controlling the braking system that when it is operated only one brake of said driving members will be applied and when controlled to turn the vehicle in the other direction for so controlling the braking system that when it is operated the other brake only of said driving members will be applied, and means operable when the change speed gearing is in a predetermined condition for preventing the steering mechanism from controlling the braking system.

16. In a vehicle provided with a steering mechanism, a change speed gearing and two driving members associated therewith, a braking system for the driving members, means operable when the steering mechanism is controlled to turn the vehicle in one direction for so controlling the braking system that when it is operated only one brake of said driving members will be applied and when controlled to turn the vehicle in the other direction for so controlling the braking system that when it is operated the other brake only of said driving members will be applied, and means operable when the change speed gearing is in one of its higher speed ratios for preventing the steering mechanism from controlling the braking system.

17. In a tractor having a change speed gearing and a rearwardly positioned driving wheel on each side of the vehicle, a front dirigible wheel, means for turning said dirigible wheel at an angle to the driving wheels to steer the tractor, a brake on each of said driving wheels, a common brake actuator for both of said brakes, a separate connection between said actuator and each brake, means connected with said dirigible wheel turning means and actuated automatically when said dirigible wheel is turned more than a predetermined angle with respect to the rear wheels to render inoperative the connection between said actuator and the brake on the driving wheel located on the outside of the curved path traversed by the tractor when said dirigible wheel is so turned, and means for causing said last-named means to be operable when the change speed gearing is in a predetermined condition.

18. In a braking system for tractors having a pair of traction wheels and, in combination therewith, speed varying means for the tractor, independent brake means for each of said traction wheels, means for operating each of said brake means separately, and means operable in predetermined positions of said speed varying means for automatically causing operation of both of said brake means simultaneously upon the attempted operation of either brake means separably.

RUSSEL D. ACTON.